United States Patent [19]

Fite, Jr. et al.

[11] Patent Number: 4,999,829

[45] Date of Patent: Mar. 12, 1991

[54] AUTOMATIC FAULT RECOVERY IN A PACKET NETWORK

[75] Inventors: Franklin D. Fite, Jr., Aberdeen; Duncan K. Sparrell, Jacobstown, both of N.J.

[73] Assignee: AT&T Bell Laboratories, Murray Hill, N.J.

[21] Appl. No.: 431,795

[22] Filed: Nov. 6, 1989

[51] Int. Cl.$^5$ ............................................. H04J 3/14
[52] U.S. Cl. ........................................ 370/16; 371/8.2
[58] Field of Search ................... 370/14, 16, 60, 94.1; 371/8.2, 11.2

[56] References Cited

U.S. PATENT DOCUMENTS

| | | | |
|---|---|---|---|
| 4,550,397 | 10/1985 | Turner et al. | 370/60 |
| 4,593,154 | 6/1986 | Takeda et al. | 370/16 |
| 4,679,189 | 7/1987 | Olson et al. | 370/60 |
| 4,703,477 | 10/1987 | Adelmann et al. | 370/94 |
| 4,777,595 | 10/1988 | Strecker et al. | 370/94.1 |
| 4,920,529 | 4/1990 | Sasaki et al. | 370/16 |

OTHER PUBLICATIONS

J. A. McDermid, "Design and Use of Comflex-A Hardware-Controlled Packet Switch", IEE Proceedings, vol. 127, Pt.E., No. 6, pp. 233-240, Nov. 1980.
I. Cidon et al., "Paris: An Approach to Integrated High-Speed Private Networks", International Journal of Digital and Analog Cabled Systems, vol. 1, No. 2, pp. 77-85, Apr.-Jun. 1988.
CCITT Recommendation Q.921, pp. 41-48.
Committee T1 Contribution, "Explicit Congestion Avoidance Indication as Part of Link Layer Management", T1S1.1-89/339, T1S1.2-89/240, Jul. 17-1989, pp. 1-14.
W. S. Lai, "Frame Relaying Service: An Overview", Proceedings IEEE Infocom 89, Apr. 23-27, 1989, pp. 668-673.
R. J. Cherukuri et al., "Frame Relay: Protocols and Private Network Applications", Proceedings IEEE Infocom 89, Apr. 23-27, 1989, pp. 676-685.

Primary Examiner—Douglas W. Olms
Assistant Examiner—Melvin Marcelo
Attorney, Agent, or Firm—Thomas Stafford

[57] ABSTRACT

An arrangement is disclosed for recovering from faults in transmission equipment or facilities forming so-called virtual circuits for transmitting packets in a network. Faults are detected in transmission paths associated with a network node and a fault indication is generated for any virtual circuits passing through the node that are affected by the fault. The fault indications are then transmitted on corresponding ones of the affected virtual circuits or on other designated virtual circuits. If any of the affected virtual circuits are terminated in the node, no fault indications are generated for them and they are switched to alternate virtual circuits. Otherwise, the fault indications are transmitted on corresponding virtual circuits or on other designated virtual circuits over facilities connected to the node to other unknown nodes. A node receiving a fault indication message determines whether the corresponding virtual circuit is terminated at the node, has one or more alternate virtual links in the node, or passes through it to some other unknown node. If an affected virtual circuit is terminated in the node, or has one or more alternate virtual links in the node, it is switched to an alternate virtual link. If the affected virtual circuit is not terminated in the node, and has no alternate virtual link present, the corresponding fault indication message is passed, i.e., switched, through it on that virtual circuit over a facility to some other unknown node.

29 Claims, 10 Drawing Sheets

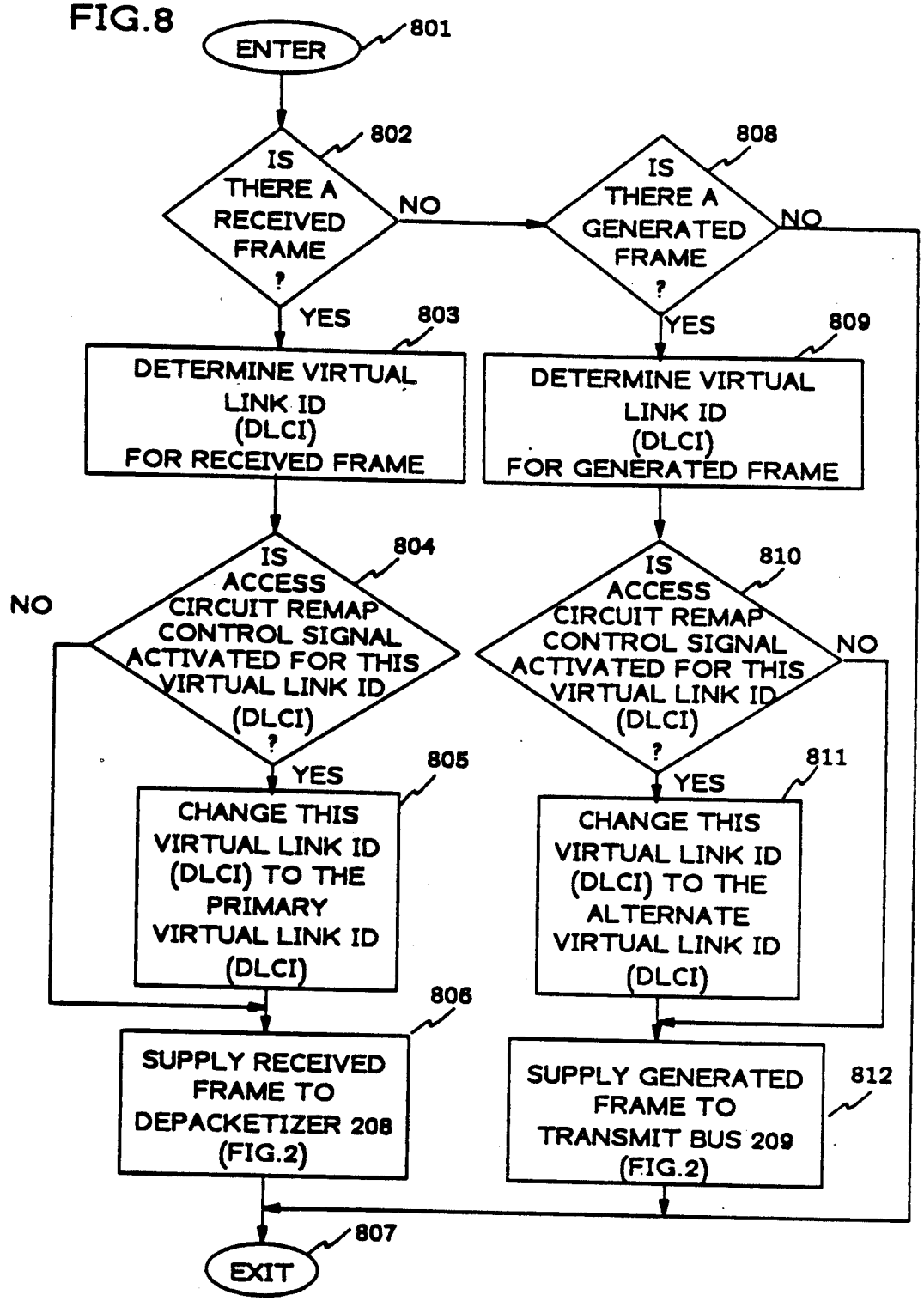

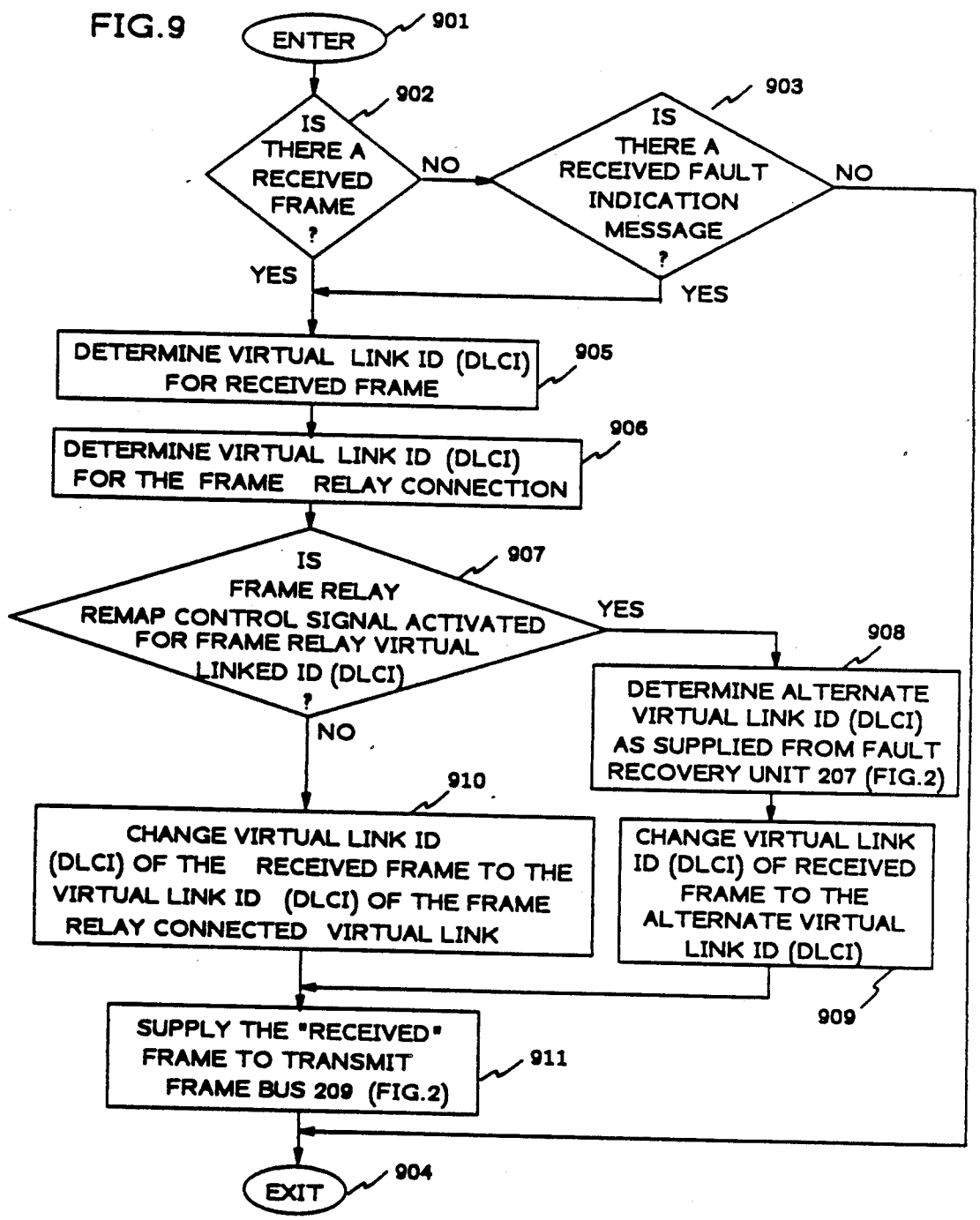

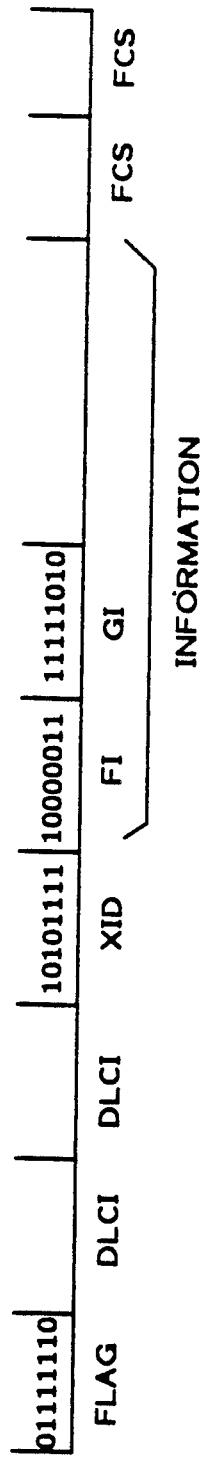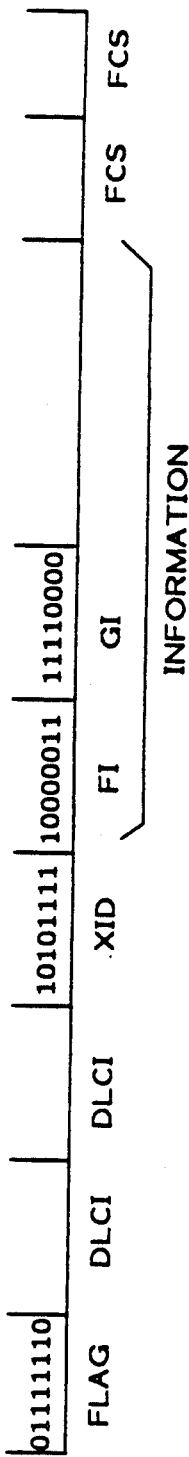

AUTOMATIC FAULT RECOVERY IN A PACKET NETWORK

CROSS-REFERENCE TO RELATED APPLICATIONS

U.S. Pat. applications Ser. No. 07/431,797 and Ser. No. 07/431,796 were filed concurrently herewith.

TECHNICAL FIELD

This invention relates to packet transmission systems and/or networks and, more particularly, to automatic recovery from faults in the system and/or network.

BACKGROUND OF THE INVENTION

Prior packet transmission and switching systems and/or networks included fault recovery arrangements. One such prior arrangement required a so-called centralized network management function to analyze reported faults and to reconfigure the network as required. Consequently, the centralized network management function required knowledge of the entire network and connectivity to each node in the network. Such arrangements are slow to respond to faults and are also susceptible to faults in the network and in the management function itself.

In another prior fault recovery arrangement, each node in the network required knowledge of the network configuration and knowledge of faults occurring in the network. In such an arrangement, each node must store additional network configuration data other than that needed for transmission of packets in the particular node. Any change in the network configuration may require a change in the formation being stored in the node. Both the storing and updating of the configuration information in the node is cumbersome and expensive to implement.

More recently, recovery from faults in a packet network has been realized by detecting faults in the transmission path associated with a network node and transmitting a fault indication message blindly for each virtual link that is affected by the fault. See, for example, the co-pending U.S. Pat. application Ser. No. 07/431,797 which was filed concurrently herewith.

Although these arrangements function satisfactorily in many applications, they may not function satisfactorily in others. Indeed, a problem with such arrangements occurs in complex networks that contain a large diversity of paths and/or uni-directional routing. For example, the previous arrangements may not properly respond to multiple faults in the network since the entire virtual circuit affected by the fault is switched to an alternate path even though only a portion or portions of the circuit are actually faulted. Furthermore, if the fault affects a uni-directional virtual circuit, the fault indication messages in the previous arrangements may not reach the originating node.

SUMMARY OF THE INVENTION

These and other problems and limitations of prior automatic packet fault recover arrangements are overcome, in accordance with an aspect of the invention, by detecting faults in transmission paths associated with a network node and, then, generating a fault indication message for virtual circuits passing, (i.e., switched) through the node representative that the virtual circuit has been affected by a detected fault. The fault indication message includes the identity of at least one virtual circuit which is affected by the fault and is transmitted in-band on the affected virtual circuit or on another specified affected virtual circuit to another unknown node. If the affected virtual circuits is terminated in the node or if one or more alternate virtual circuits are present in the node for the affected virtual circuit no such fault indication message is generated for it and it is switched to an at least one alternate virtual circuit in the node. Any generated fault indication message is sent from the node that is affected by the detected fault toward an unknown node. If a node that receives such a fault indication message has one or more alternate virtual links for any virtual circuit identified by the fault indication message, that node switches the at least one virtual circuit identified in the fault indication message to one of the alternate virtual links. If the node receiving the fault indication message does not have any alternate virtual links assigned to the affected virtual circuit identified in the fault indication message, the fault indication is passed, i.e., switched through the node, on the affected virtual circuit or some other designated affected virtual circuit to some other unknown node.

In one embodiment of the invention, fault indication messages are generated for each affected virtual circuit and transmitted from the node affected by the detected fault in a direction away from the fault and in a direction towards the fault.

In another embodiment of the invention, a node receiving the fault indication message(s) may have more than one alternate virtual link assigned to the virtual circuit(s) identified in the fault indication message(s). Such a node switches the virtual circuit identified in the fault indication message to a selected one of the assigned alternate virtual links. The selection of the alternate virtual link may be realized by employing any one of a number of selection techniques, for example, by using a priority scheme or by considering the available capacity on each of the routes taken by the alternate virtual links. In one embodiment, the alternate virtual link on the route with the most available capacity (i.e., the least congestion) is chosen.

BRIEF DESCRIPTION OF THE DRAWINGS

In the drawings:

FIG. 8 is a flow chart illustrating a sequence of operations effected by the access circuit mapping unit of FIG. 2;

FIG. 9 is a flow chart showing a sequence of operations effected by the frame mapping unit of FIG. 2;

FIG. 10 is a graphic representation of a LAPD frame; and

FIGS. 11 and 12 are graphic illustrations of fault indication messages employed in this embodiment of the invention.

DETAILED DESCRIPTION

Figure 1:
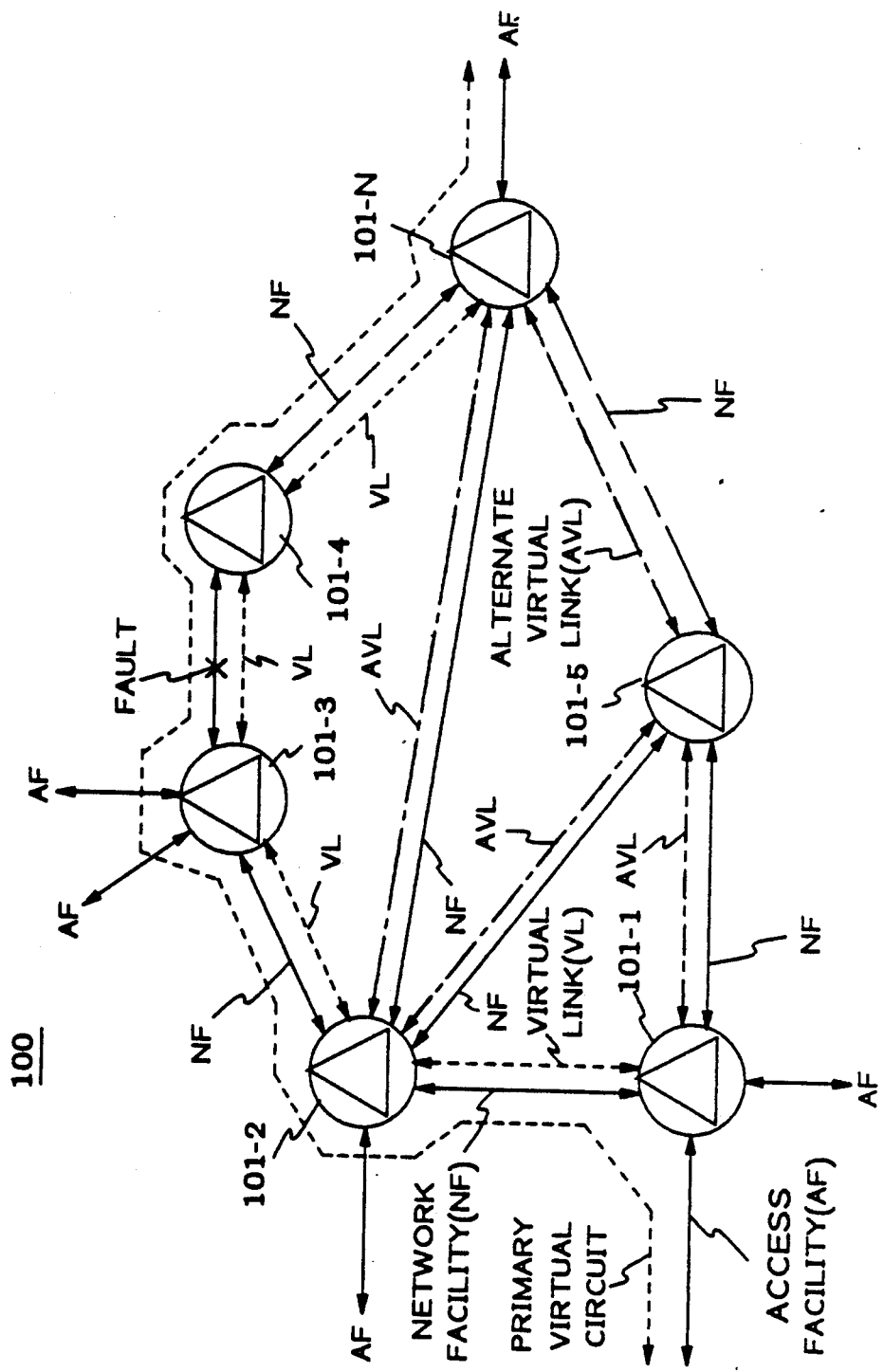
FIG. 1 shows, in simplified form, a packet transmission system and/or network including an embodiment of the invention.

FIG. 1 shows, in simplified form, details of transmission system and/or network 100 employing an embodiment of the invention. Accordingly, shown are a plurality of system and/or network nodes, namely, nodes 101-1 through 101-N. Hereinafter all references will be made to network nodes, etc. Also shown are a number of network facilities (NFs) connecting nodes 101 and access facilities (AFs) connected to particular ones of nodes 101. Network facilities carry virtual links (VLs) between nodes inside the network. It is noted that some virtual links are designated alternate virtual lines (AVLs) and are shown in dot-dashed outline. Access facilities carry access circuits from the network to outside of the network and, conversely, from outside of the network to the network. In this example, some of nodes 101 are identical and others are not identical depending on their particular function in the network. That is, some of nodes 101 have access facilities connected to them while others do not. It will also be apparent that particular ones of nodes 101 may have a plurality of access facilities. Similarly particular ones of nodes 101 may interface with a plurality of network facilities connecting them to one or more other nodes. In this specific example, it is assumed that the network facilities are either T1, CEPT1, or T3 transmission facilities using non-channelized ISDN packet mode framing formats, e.g., LAPD, protocols, and procedures. In some different applications, other facilities may be employed, for example, local area networks, wide area networks, RS232 and the like. Each network facility carries a set of virtual links or alternate virtual links. The access facilities are assumed to be T1 or ISDN basic rate interface (BRI) facilities. Each access facilities carries one or more access circuits. In a network node, an access circuit may be connected to a virtual link or a virtual link may be connected to another virtual link. A virtual circuit for a call comprises a local access circuit, one or more virtual links connected through one or more nodes and at least one remote access circuit. It will be apparent to those skilled in the art that other transmission facilities and other packet protocols may equally be employed in practicing the invention.

For the purposes of illustrating the fault recovery operation of network 100, in accordance with an aspect of the invention, it is assumed that a primary virtual circuit, shown in dashed outline, is provisioned between an access circuit carried on the access facility (AF) shown connected to originating node 101-1 and an access circuit carried on the access facility (AF) shown connected to destination node 101-N. The primary virtual circuits is carried from originating node 101-1 to destination node 101-N through a primary path including nodes 101-2, 101-3 and 101-4 and virtual links (VLs) carried on the associated network facilities (NFs). Additionally, two alternate virtual links (AVLs), shown in dot-dashed outline, are provisioned from node 101-2 to node 101-5 and destination node 101-N, and one alternate virtual link is provisioned from originating node 101-1 to node 101-5. Although only one primary virtual circuit and three alternate virtual links are shown, there may be a plurality of such virtual circuits and links in the network. Moreover, it is important to note that none of nodes 101 in network 100 has knowledge of any other node in the network. Each of nodes 101, only knows its own mappings of access circuits to virtual links and virtual links to virtual links. These mappings include access circuits to alternate virtual links, virtual links to alternate virtual links and alternate virtual links to alternate virtual links. It is further noted that a fault can occur in the node equipment itself or in one or more network facilities connecting nodes. In this example, it is assumed that a fault occurs somewhere in the transmission path between nodes 101-3 and 101-4.

When the fault occurs, the primary virtual circuit is disrupted along the primary path between originating node 101-1 and destination node 101-N. Upon detecting the fault, each of node 101-3 and 101-4 determines that a particular virtual circuit, among others, is affected by the fault. Node 101-3 generates a fault indication message and supplies it as an output on the affected virtual circuit to node 101-2. Node 101-3 also generates a fault indication message and supplies it as an output on the affected virtual circuit toward node 101-4. If the fault is uni-directional, this fault indication message may reach node 101-4. In this example, the fault indication message is a LAPD frame (FIGS. 11 and 12) using a XID format (See CCITT Recommendation Q.291, pages 42–48, and a Committee T1 Contribution, "Explicit Congestion avoidance indication as part of Link Layer management", T1S1.1-89/339, T1S1.2-89/240, Jul. 17–19, 1989, pages 1–14 for an explanation of the LAPD frame and XID format). Similarly, node 101-4 generates a fault indication message and supplies it as an output on the affected virtual circuit to node 101-N. Also, node 101-4 supplies as an output a fault indication message on the affected virtual circuit to node 101-3. Again, it is noted that neither node 101-3 nor node 101-4 has knowledge of other nodes in the path or of the end points of the effected virtual circuit. Nodes 101-3 and 101-4 include information relating only to the virtual link to virtual link mapping of the virtual circuit. Upon receiving the fault indication message, node 101-2 determines whether one or more alternative virtual links are present at this node for the affected virtual circuit. Since node 101-2 includes two alternate virtual links for the affected virtual circuit, node 101-2 switches the virtual link between node 101-2 and node 101-3 to one of the two alternate virtual links. The choice of which alternate virtual link to use may be made determining which alternate virtual link is on the least congested network facility, where congestion is measured in a manner know to the art (see for example, U.S. Pat. No. 4,703,477 issued Oct. 27, 1987 for a congestion control arrangement). Alternatively, a priority scheme may be used to select the alternate virtual link. To this end, a pre-provisioned priority exists for each alternate virtual link and an alternate virtual link not not affected by any fault with the highest priority is chosen. It will be apparent to those skilled in the art that other techniques for choosing an alternative virtual link may also be used. Once an alternate virtual link is chosen, the virtual circuit is switched to use that alternate virtual link instead of the affected virtual link. Thus, it is seen that, in accordance with an aspect of the invention, the network has recovered from the fault on the affected virtual circuit. Furthermore, it can be seen that, in accordance with an aspect of the invention, this recovery is accomplished without any node having information relating to the network topology other than for the network facilities that terminate at individual ones of nodes 101. Moreover, switching from the affected virtual links to the alternate virtual links is accomplished at an intermediate node, not at the endpoint of the virtual circuit.

Figure 2:
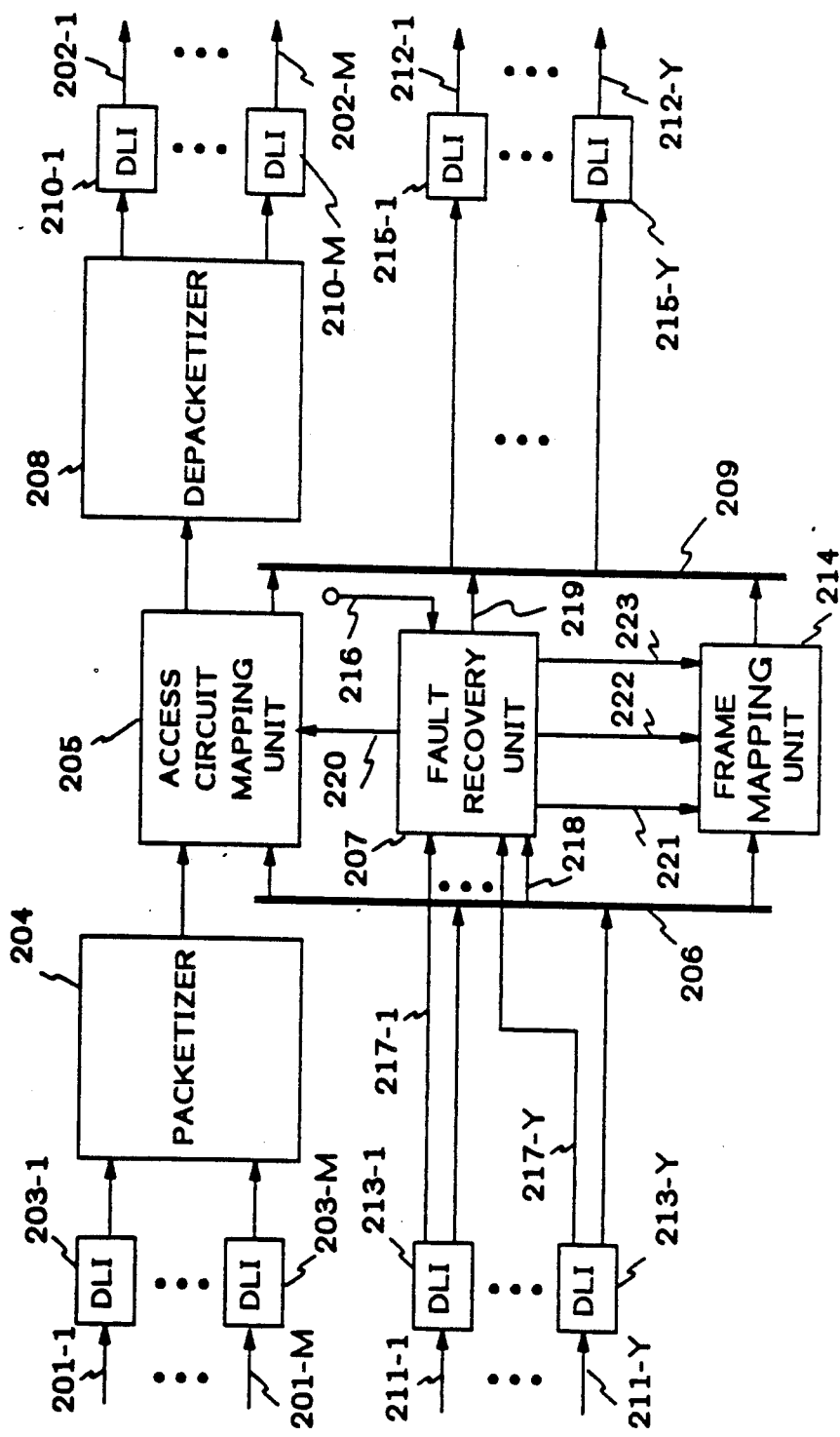
FIG. 2 depicts, in simplified block diagram form, details of a packet node used in the system and/or network of FIG. 1.

FIG. 2 shows, in simplified block diagram form, the general architecture of nodes 101. It is to be noted that the configuration of specific ones of nodes 101 may include an interface to at least one network facility and may not include any access facilities. However, a typical one of nodes 101 includes one or more receive access facilities 201-1 through 201-M, and a corresponding number of transmit access facilities 202-1 through 202-M. It is noted that pairs of receive access facilities 201-1 through 201-M and transmit access facilities 202-1 through 202-M, respectively, form the access facilities (AFs) shown in FIG. 1. As indicated above, the signals received and transmitted on the access links may take any desired form. In this example it is assumed that the access facility signals are non-packetized T-carrier in the known DS1 format. Thus, in this example, an access facility carries up to 24 access circuits. Signals obtained from receive access facilities 201-1 through 201-M are supplied via digital line interface (DLI) units 203-1 through 203-M, respectively, to packetizer 204. Each of digital line interfaces 203 are of a type well known in the art for interfacing the DS1 signals being supplied via the receive access facilities 201. Packetizer 204 forms incoming voice or data information into a packet format. Such packetizers are known in the art. In this example, the LAPD format is used for packetization. The LAPD layer 2 data unit is known as a frame, and the layer 3 data unit is known as a packet. Thus, throughout this example, the term "frame" is used instead of "packet". The LAPD frames (FIG. 10) generated in packetizer 204 are supplied to access circuit mapping unit 205. Access circuit mapping unit 205 also obtains received frames from receive frame bus 206. Additionally, access circuit remap control signals are supplied to access circuit mapping unit 205 via circuit path 220 from fault recovery unit 207. The access circuit remap control signals control remapping of access circuits carried on receive access facilities 201 to virtual links carried on transmit network facilities 212, and the remapping of virtual links carried on receive network facilities 211 to the original access circuits carried on transmit access facilities 202. Access circuit mapping unit 205 yields so-called terminated frames which are supplied to depacketizer 208, and so-called transmit frames which are supplied to transmit frame bus 209. Operation of access circuit mapping unit 205 is described below in conjunction with FIG. 8. Depacketizer 208 reconstructs the voice or data digital signals from the terminated LAPD frames. These signals are supplied via digital line interface (DLI) units 210-1 through 210-M to transmit access facilities 202-1 through 202-M, respectively. Again, such digital line interface units and such depacketizers are known in the art.

Received LAPD frames from receive network facilities 211-1 through 211-Y are supplied to digital line interface (DLI) units 213-1 through 213-Y, respectively. Each of digital line interface units 213 is of a type well known in the art for interfacing DS1 digital signals. In this example, each of digital line interface (DLI) units 213 generates a facility failure signal in well known fashion. The facility failure signals from digital line interfaces 213-1 through 213-Y each indicate whether a red, yellow, blue, or performance alarm has occurred and are supplied via circuit paths 217-1 through 217-Y, respectively, to fault recovery unit 207. Each of digital line interface units (DLIs) 213-1 through 213-Y supplies the received LAPD frames to receive frame bus 206. The received frames can be of many types, including received fault indication messages as shown in FIGS. 11 and 12. Fault recovery unit 207 obtains the received fault indication messages from receive frame bus 206 via circuit path 218, in well known fashion. An equipment failure signal indicating the failure of any unit in this node in the path of any virtual circuit is supplied via circuit path 216 to fault recovery unit 207. Fault recovery unit 207 generates transmit fault indication messages which are supplied via circuit path 219 to transmit frame bus 209 and receive fault indication messages which are supplied via circuit path 221 to frame mapping unit 214. Fault recovery unit 207 supplies a frame relay remap control signal via circuit path 222 and an alternate virtual link ID via circuit path 223 to frames mapping unit 214. Frame mapping unit 214 obtains the received frames from received frame bus 206. Additionally, frame mapping unit 214 relays transmit frames from receive frame bus 206 to transmit frame bus 209. To this end, frame mapping unit 214 employs the known frame relay precedure to remap these incoming frames into transmit frames that are supplied to transmit frame bus 209. The relayed frames include appropriate address mapping for each virtual circuit. That is to say, LAPD frames that are passing through this node are frame relayed from receive bus 206 to transmit frame bus 209. The operation of frame mapping unit 214 is described below in conjunction with FIG. 9. In turn, the appropriate transmit frames are obtained from transmit frame bus 209 by digital line interface units 215-1 through 215-Y and, then, supplied to transmit network facilities 212-1 through 212-Y, respectively. Pairs of receive network facilities 211-1 through 211-Y and transmit network facilities 212-1 through 212-Y form the network facilities (NFs) shown in FIG. 1.

Fault recovery unit 207 monitors for fault indication messages (FIGS. 11 and 12) on receive frame bus 206. This is achieved by monitoring received frames for those that match a prescribed format. To this end, control fields in the received frames are monitored to determine if the frames include a fault indication message. In this example, the prescribed format is the so-called LAPD XID frame format denoting fault indication messages for either a fault condition or a clear condition, as shown in FIG. 11 and FIG. 12, respectively. As shown in both FIG. 11 and FIG. 12 the affected virtual circuit ID (DLCI) is included in the DLCI fields, an indication (in this example, 10101111) that the LAPD frame is an XID frame is included in the XID field, an indication that this XID frame is a fault indication message, in accordance with an aspect of the invention, is included in the FI field and an indication, in accordance with another aspect of the invention, of whether the fault indication message denotes a fault or a clear condition is included in the GI field. Thus, in this example, as shown in FIG. 11, the indication 11111010 in the GI field denotes a fault condition and, as shown in FIG. 12, the indication 11110000 in the GI field denotes a clear condition. It will be apparent to those skilled in the art. that other signaling arrangements may equally be employed to indicate the presence of a fault indication message. Upon obtaining a fault indication message, fault recovery unit 207 either sends an access circuit remap control signal to access circuit mapping unit 205 causing it to switch a corresponding access circuit to an alternate virtual link, in accordance with an aspect of the invention, or it sends a frame relay remap control signal via circuit path 222 and an alternate virtual link ID via circuit path 223 to frame mapping unit 214 causing it to switch the corresponding virtual link to an alternate virtual link, in accordance with an aspect of the invention, or it sends a corresponding receive fault indication message via circuit path 221 to frame mapping unit 214. In turn, frame mapping unit 214 supplies the fault indication message to another node on a virtual link included in the primary virtual circuit. Additionally, fault recovery unit 207 monitors for facility or equipment failures, and either orders access circuit mapping unit 205 via access circuit remap control signal or frame mappin unit 214 via frame relay remap control signals to switch the affected access circuits or virtual links to alternate virtual links and/or generates transmit fault indication messages to be passed via transmit frame bus 209 and appropriate ones digital line interface (DLI) units 215-1 through 215-Y and transmit network facilities 212-1 through 212-Y, respectively, to other ones of nodes 101 in network 100 (FIG. 1). Further details regarding operation of fault recovery unit 207 are discussed below in conjunction with FIGS. 3 through 6.

Figure 3:
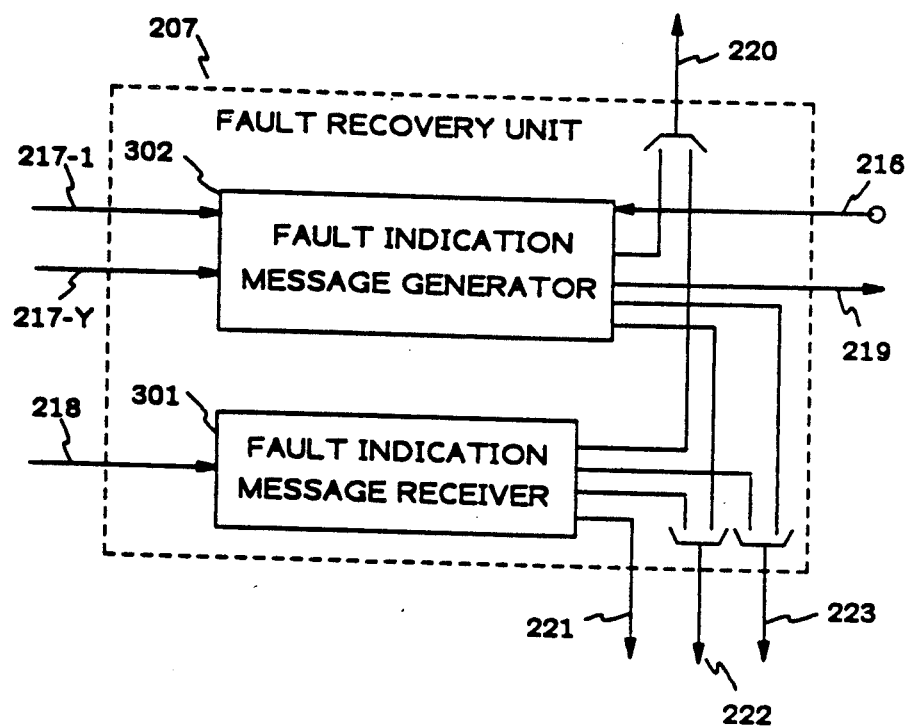
FIG. 3 shows, in simplified block diagram form, details of the fault recovery unit employed in the node of FIG. 2.

FIG. 3 depicts, in simplified block diagram form, details of fault recovery unit 207 of FIG. 2. Accordingly, shown are fault indication message receiver 301 and fault indication message generator 302. Fault indication message receiver 301 obtains received fault indication messages via circuit path 218 from receive frame bus 206. If the received fault indication message is for an access circuit in this node, the access circuit remap control signal for that access circuit is activated and supplied via circuit path 220 to access circuit mapping unit 205. If the received fault indication message is on a virtual link that has one or more alternate virtual links in this node, the frame relay remap control signal and the alternate virtual link ID (DLCI) are supplied via circuit paths 222 and 223, respectively, to frame mapping unit 214. If a received fault indication message is not for an access circuit in this node and if it is not on a virtual link that has one or more alternate virtual links in this node, it is supplied unchanged via circuit path 221 to frame mapping unit 214. The operation of fault indication message receiver 301 is shown in the flow chart of FIG. 4 and described below. Fault indication message generator 302 is responsive to either a facility failure signal or an equipment failure signal becoming active or inactive. When either failure signal becomes active, fault indication message generator 302 determines if the failure affects an access circuit terminated in this node or if it affects a virtual link that has one or more alternate virtual links in this node. If an access circuit terminated in this node is affected, an access remap control signal for the access circuit is activated. If a virtual link that has one or more alternate virtual links in this node is affected, a frame relay remap control signals for the virtual link is activated. If the affected virtual circuits is not terminated in this node and if not alternate links exist for the affected virtual link, in this example, two fault indication messages including a fault indication (FIG. 11) are generated for the affected virtual circuit. One fault indication message is sent on the virtual circuit in the direction of the fault and the other one is sent in the direction away from the fault. Similarly, when the fault is cleared, either the access circuit remap control signal or the frame relay remap control signal is deactivated, or two fault indication messages including a clear indication (FIG. 12) are generated. Operation of fault indication message generator 302 is described below in conjunction with the flow chart shown in FIGS. 5, 6 and 7.

Figure 4:
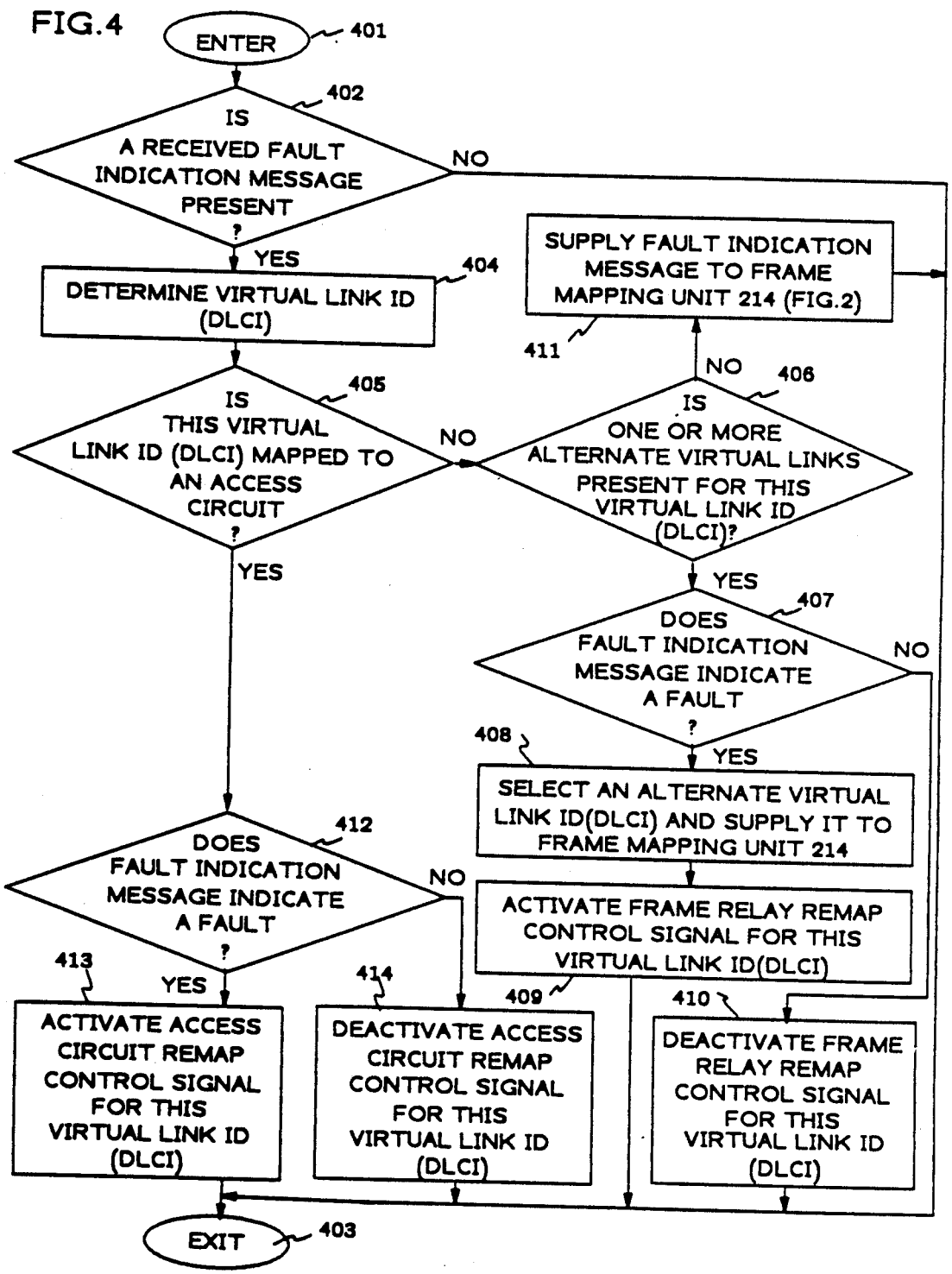
FIG. 4 is a flow chart of a sequence of operations effected by the fault indication message of FIG. 3.

FIG. 4 is a flow chart showing a sequence of operations effected in fault indication message receiver 301 or FIG. 3. Accordingly, the sequence is entered via step 401. Thereafter, conditional branch point 402 tests to determine if there is a receive fault indication message on receive frame bus 206 (FIG. 2). If the test result is NO, the sequence is exited via step 403. If the test result in step 402 is YES, operational block 404 determines the virtual link identification corresponding to the obtained fault indication message. In the LAPD format this identification (ID) is known as the DLCI. Then, conditional branch point 405 tests to determine if the determined virtual link ID (DLCI) is mapped to an access circuit in this node. If the test result in step 405 is NO, conditional branch point 406 tests to determine if the determined virtual link (DLCI) has one or more alternate virtual links in this node. If the test result in step 406 is YES, conditional branch point 407 tests to determine if the fault indication message indicates a fault. As indicated above, a fault indication message indicates a fault, in this example, when field GI includes 1111010, as shown in FIG. 11. If the test result in step 407 is YES, operational block 408 selects one of the alternate virtual link IDs and supplies it as an output from fault recovery unit 207 via circuit path 223 to frame mapping unit 214. This selection may be done in many ways, including measuring congestion in the network facilities and choosing an alternate virtual link on the least congested network facility. Operational block 409 then supplies as an output an activated frame relay remap control signal for this virtual link via circuit path 222 to the frame mapping unit 214. The sequence is then exited via step 403. If the test result in step 407 is a NO, the fault indication message indicates a clear condition and operational block 410 supplies as an output a deactivated frame relay remap control signal via circuit path 222 to frame mapping unit 214. A fault indication indicates a clear condition, in this example, when field GI includes 11110000, as shown in FIG. 11. The sequence is then exited via step 403. If the test result of 406 is NO, the virtual link denoted by this DLCI is frame relayed via frame mapping unit 214 (FIG. 2) through this node. To this end, operational block 411 supplies as an output the received fault indication message to frame mapping unit 214 (FIG. 2). Thereafter, the sequence is exited via step 403. If the test result in step 405 is YES, the virtual link denoted by this DLCI is mapped to an appropriate access circuit in this node, i.e., the virtual circuit is terminated at this node. Conditional branch point 412 test to determine whether the received fault indication message indicates the activating of a fault or the clearing of a fault (FIG. 11 or FIG. 12, respectively). If the test result in step 412 is YES, indicating the activation of a fault, operational block 413 supplies as an output an activated access circuit remap control signal for this virtual link ID (DLCI) to access circuit mapping unit 205 (FIG. 2). Thereafter, the sequence is exited via step 403. If the test result in step 412 is NO, indicating clearing of a fault, operational block 409 supplies as an output a deactivated access circuit remap control signal for this virtual link ID (DLCI) to access circuit mapping unit 205 (FIG. 2). Thereafter, the sequence is exited via step 403. Alternatively, the operations of steps 402, 404 and 405 could be reversed in order, such that steps 404 and 405 are performed for all received frames and if the test result in step 405 is YES, then step 402 is performed to determined if the received frame includes a fault indication message.

Figure 5:
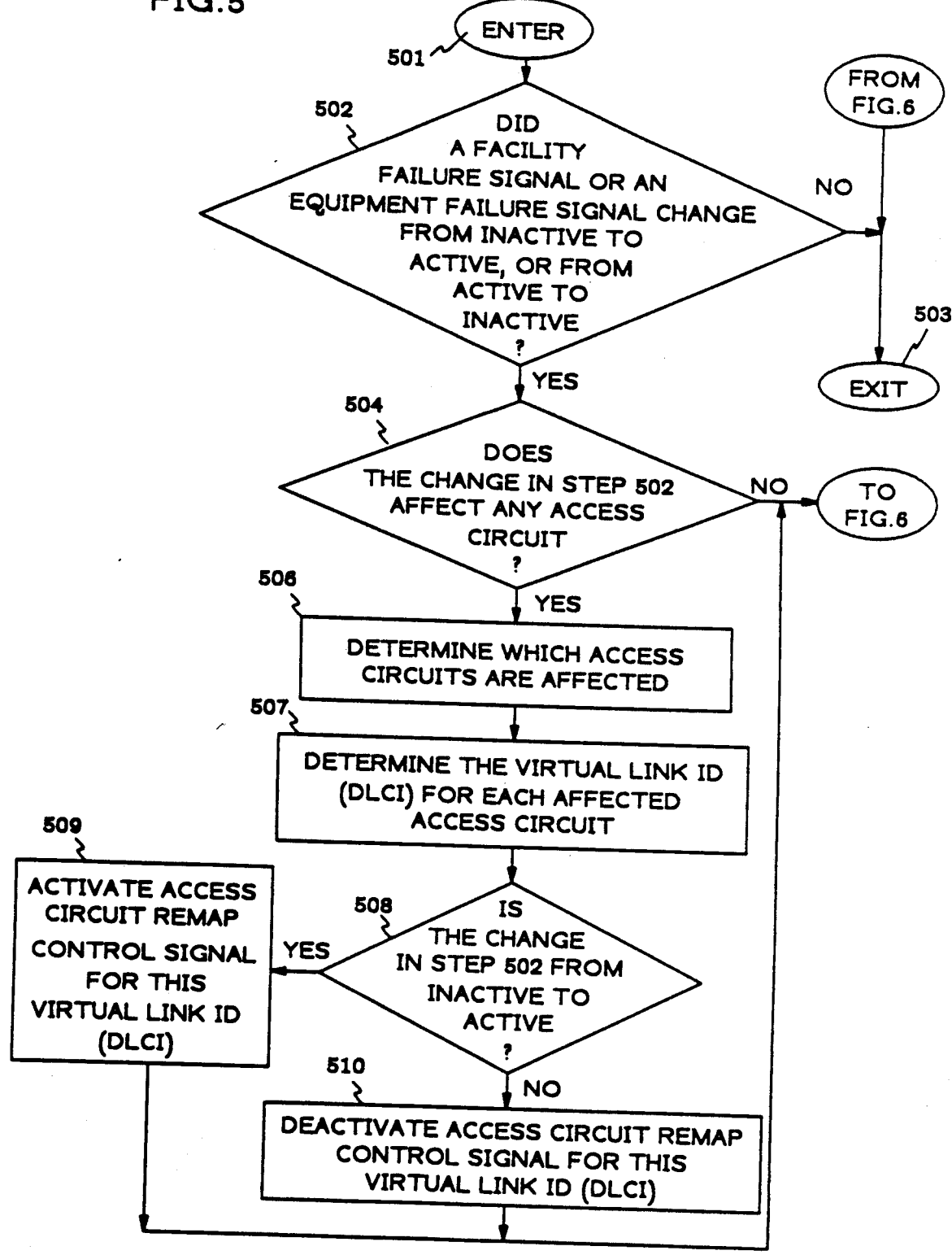
FIGS. 5, 6 and 7 when connected as shown, form a flow chart illustrating a sequence of operations effected by the fault indication message generator of FIG. 3.
Figure 6:
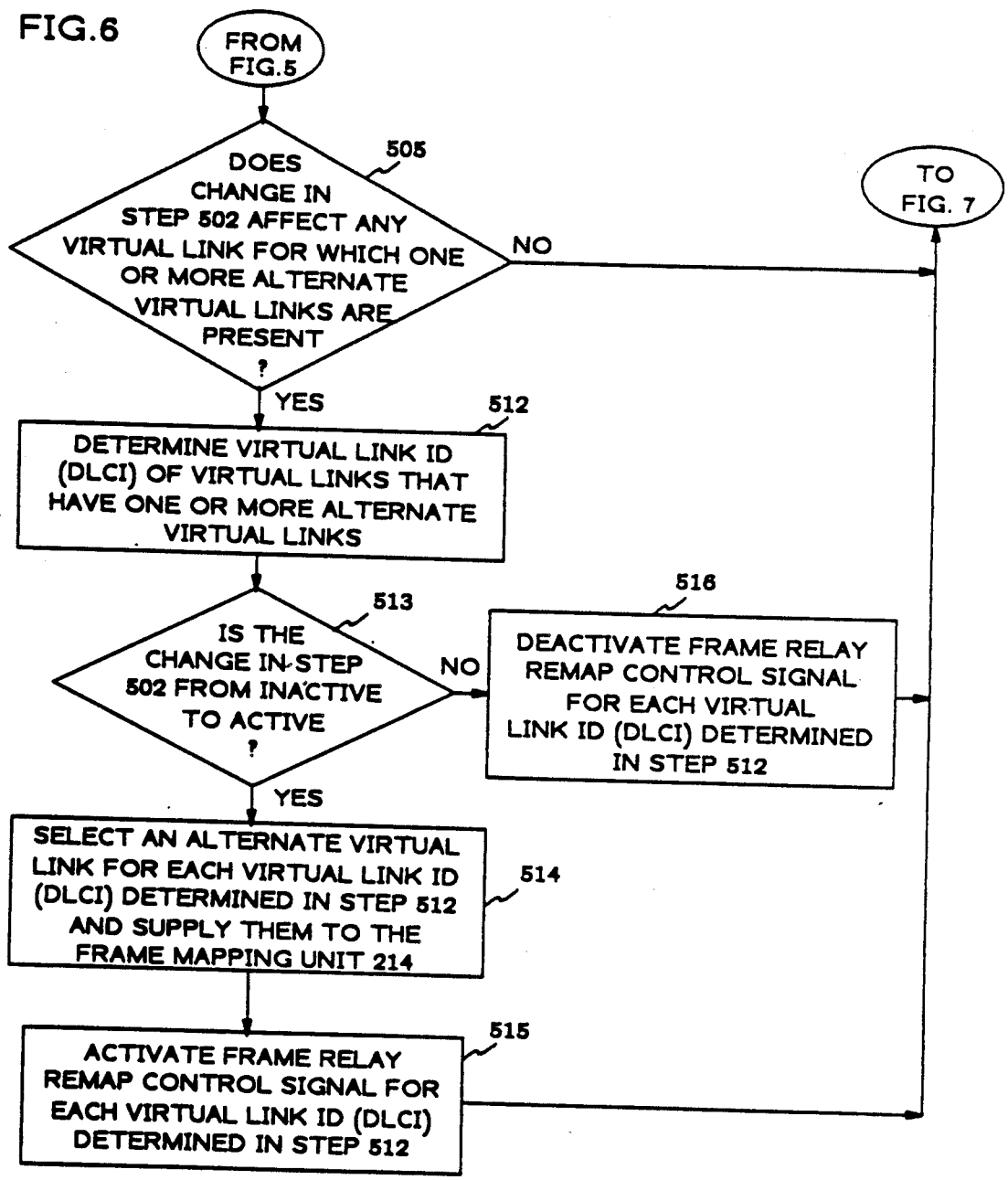
Figure 7:
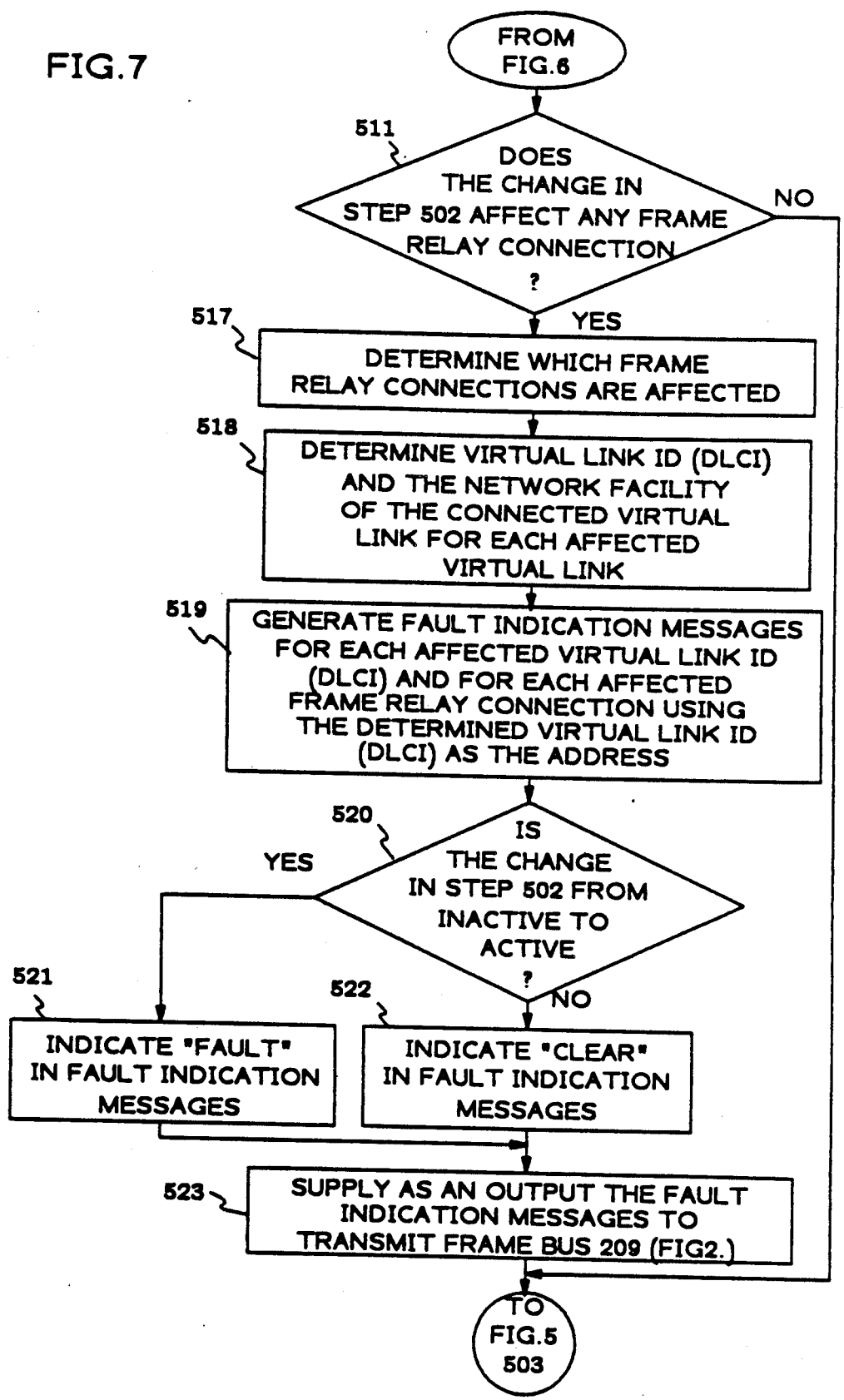

FIGS. 5, 6 and 7, when connected as shown, form a flow chart of a sequence of operations effected by fault indication message generator 302 of FIG. 3. Accordingly, the sequence is entered via step 501. Thereafter, conditional branch point 502 tests changes in the state of either the facility failure signal or equipment failure signal. The active state indicates that a fault has occurred and the inactive state indicates that no fault is present, i.e., a clear condition. If there is no change in the state of these failure signals, the sequence is exited via step 503. If there is a change in the state of either of the failures signals, conditional branch point 504 tests to determine if the change of state in either of the failure signals affects any virtual link that is mapped to an access circuit at this node. If the test result in step 504 is NO, control is supplied to conditional branch point 505 (FIG. 6). If the test result in step 504 is YES, operational block 506 determines which access circuits are affected. It is noted that more than one access circuit may be affected. Then, operational block 507 determines the virtual link ID (DLCI) for each affected access circuit. Conditional branch point 508 tests to determine if the change in state of either failure signal is from inactive to active. If the result in step 508 is YES, operational block 509 activates the access circuit remap control signal for this virtual link ID (DLCI). Then, control is supplied to conditional branch point 505 (FIG. 6) if the test result in step 508 is NO, operational block 510 deactivates the access circuit remap control signal for this virtual link ID (DLCI). Thereafter, control is supplied to conditional branch point 505 (FIG. 6). Conditional branch point 505 tests to determine if the change in state of either failure signal in step 502 affects any virtual links for which one or more alternate virtual links are present in this node. If the test result in step 505 is NO, control is supplied to conditional branch point 511 (FIG. 7). If the test result in step 505 is YES, operational block 512 determines the virtual link IDs (DLCIs) of the virtual links that have alternate virtual links present in this node. Then, conditional branch point 513 tests to determine if the change in state in step 502 was from inactive to active, indicating a fault has occurred. If the test result in step 513 is YES, indicating a fault, operational block 514 selects an alternate virtual link for each determined virtual link ID (DLCI) from step 512 and supplies the alternate virtual link ID to frame mapping unit 214. This selection may be done by considering network facility congestion, by using a priority scheme or in some other manner. Operational block 515 then activates the frame relay remap control signal for the determined virtual link IDs and supplies it as an output to frame mapping unit 214. Control is then passed to conditional branch point 511 (FIG. 7). If the test result in step 513 is NO, indicating a clear condition, operational block 516 supplies as an output a deactivated frame relay remap control signal to frame mapping unit 214 for the virtual link IDs determined in step 512. Control is then passed to conditional branch point 511 (FIG. 7). Conditional branch point 511 tests to determine if the change in state of either failure signal in step 502 affects any so-called frame relay connection, i.e., virtual link to virtual link connection for which no alternate virtual links are present in this node. It is noted that an affected frame relay connection includes a faulted or cleared virtual link and a connected virtual link. IF the test result in step 511 is NO, the sequence is exited via step 503 (FIG. 5). If the test result in step 511 is YES, operational block 517 determines which frame relay connections are affected by the fault. Operational block 518 determines the virtual link ID (DLCI) and the network facility of the connected virtual link for each affected virtual link. Operational block 519 generates, in this example, two fault indication messages for each affected frame relay connection. The virtual link ID (DLCI) that was determined in step 518 is used as the address for one of the fault indication messages and the affected virtual link ID is used for the address of the other fault indication message. Conditional branch point 520 tests to determine whether the change in state of either failure signal in step 502 is from inactive to active. If the test result in step 520 is YES, operational block 521 causes the fault indication messages generated in block 519 to indicate "fault" (GI field includes 1111010, FIG. 11). If the test result in step 520 is NO, operational block 522 causes the fault indication messages generated in block 519 to indicate "clear" (GI field includes 11110000, FIG. 12). Thereafter, operational block 523 supplies as an output the fault indication meassages to transmit frame bus 209 (FIG. 2). Then, the sequence is exited via step 503 (FIG. 5).

FIG. 8 is a flow chart of a sequence of operations effected by access circuit mapping unit 205 of FIG. 2. Accordingly, the sequence is entered via step 801. Thereafter, conditional branch point 802 tests to determine if a received frame is present on receive frame bus 206 (FIG. 2). If the test result in step 802 is YES, operational block 803 determines the virtual link ID (DLCI) for the received frame. Conditional Branch point 804 tests to determine if the access circuit remap control signal is active for this virtual link ID (DLCI). If the test result in 804 is YES, operational block 805 causes the virtual link ID (DLCI) determined in step 803 to be modified to a DLCI for the appropriate virtual link ID of the primary virtual circuit. IF the test result in step 804 is NO, no action is taken to change the virtual link ID (DLCI) and operational block 806 supplies the received frame to depacketizer 208 (FIG. 2). Thereafter, the sequence is exited via step 807. Returning to step 802, if the test result is NO, conditional branch point 808 tests to determine if there is a generated frame from packetizer 204 (FIG. 2). If the test result in step 808 is NO, the sequence is exited via step 807. If the test result in step 808 is YES, operational block 809 determines the virtual link ID (DLCI) for the generated frame. Then, conditional branch point 810 tests to determine if the access circuit remap control signal is active for this virtual link ID (DLCI). If the test result in step 810 is YES, operational block 811 changes the virtual link ID (DLCI) in the generated frame to the alternate virtual link ID (DLCI) for the appropriate alternate virtual link. Then, operational block 812 supplies as an output the generated frame to transmit frame bus 209 (FIG. 2). Thereafter, the sequence is exited via step 807. Returning to step 810, if the test result is NO, the gnerated frame DLCI is not changed and steps 812 and 807 are iterated.

FIG. 9 is a flow chart of a sequence of operations effected in frame mapping unit 214 of FIG. 2. This flow chart does not completely describe the LAPD frame relay function known to the art but only those functions necessary to this embodiment of the invention. Accordingly, the sequence is entered via step 901. Then, conditional branch point 902 tests to determine if there is a received froame on receive frame bus 206 (FIG. 2). If the test result in step 902 is NO, conditional branch point 903 tests to determine if there is a receive fault indication message on receive frame bus 206 (FIG. 2). IF the result in step 903 is NO, the sequence is exited via step 904. IF the test result in either step 902 or step 903 is YES, operational block 905 determines the virtual link ID (DLCI) for the received frame. Operational block 906 determines the virtual link ID (DLCI) for the connected virtual link, i.e., the frame relay connection. Conditional branch point 907 tests to determine if the frame relay remap control signal from fault recovery unit 207 is active for the virtual link ID (DLCI) determined in block 906. If the test result in step 907 is YES, operational block 908 determines the alternate virtual link ID (DLCI) as supplied from fault recovery unit 207 (FIG. 2). Operational block 909 then changes the virtual link ID (DLCI) of the received frame to the alternate virtual link ID (DLCI) determined in step 908. Control is then passed to operational block 911. IF the test result in step 907 is NO, operational block 910 changes the virtual link ID (DLCI) of the received frame to the virtual link ID (DLCI) for the connected virtual link. Operational block 911 supplies as an output the modified "received" frame to the transmit frame bus 209 (FIG. 2). Thereafter, the sequence is exited by step 904.

Although this embodiment of the invention has been described in terms of so-called provisioned virtual circuits and frame-relay, it will be apparent to those skilled in the art that the invention is equally applicable to switch virtual circuits and to frame switching arrangements. Additionally, it will also be apparent that the fault indications, i.e., fault or clear, may be transported in other ways than individual faults indication messages for each affected virtual circuit. Indeed, fault indication messages including the identification of all virtual circuits being transported on a network facility could be employed. See co-pending application Ser. No. 07/431,796.

For an arrangement using such fault indication messages. Moreover, it will be apparent to those skilled in the art that still other transport techniques may be employed to transport the fault indication message to the unknown nodes to effect the fault recovery in accordance with the principles of the invention.

We claim:

1. Apparatus in a packet node for recovering from faults in transmission paths including at least one virtual circuit in a network including a plurality of packet nodes, the apparatus comprising:
    means for detecting faults in at least one transmission path associated with the node;
    first means for determining if any virtual circuit affected by a detected fault is terminated in the node;
    second means for determining if any virtual circuit affected by the fault has at least one alternate virtual circuit present in the node;
    means for generating fault indication messages for virtual circuits affected by the detected fault that are not terminated in the node and have no alternate virtual circuit present in the node;
    first means for transmitting each of said generated fault indication messages on associated virtual circuits to some other node in the network; and
    means for switching any affected virtual circuits determined to be terminated in the node or determined to have at least one alternate virtual link present in the node to associated alternate virtual circuits for transmission toward a destination node.

2. The apparatus as defined in claim 1 further including
    means for receiving fault indication messages including third means for determining if a virtual circuit identified in a received fault indication message is terminated in the node and fourth means for determining if a virtual circuit identified in a received fault indication message has at least one alternate virtual link present in the node, and
    second means for transmitting any of said received fault indication messages not associated with a virtual circuit terminated in the node or not having at least one alternate virtual circuit present in the node on associated virtual circuits to some other node in the network.

3. The apparatus as defined in claim 2 wherein each of said virtual circuits comprises a first access circuit at an originating node, a second access circuit at a destination node and at least one virtual link.

4. The apparatus as defined in claim 3 wherein said first means for transmitting includes means for transmitting said fault indication messages in a direction away from the detected fault and towards the detected fault on said associated virtual circuits.

5. The apparatus as defined in claim 3 wherein said received fault indication message includes an identity of an affected virtual link of a virtual circuit, said third means for determining includes means for generating a first control signal representative of whether said virtual link identified in the received fault indication message is mapped to an access circuit in the node, said fourth means for determining includes means for generating a second control signal representative that at least one alternate virtual link is present in the node for said virtual link identified in said received fault indication message, and said means for switching includes first switching means being responsive to said first control signal for changing the identity of said identified virtual link to an alternate virtual link identity when said first control signal indicates that said virtual link is mapped to an access circuit in the node, wheein said access circuit is mapped to an alternate virtual circuit for transmission to said access circuit in said destination node and second switching means being responsive to said second control signal for selecting and identifying said at least one alternate virtual link so that said identified affected virtual link is mapped to said selected at least one alternate virtual link for transmission to said access circuit at said destination node.

6. The apparatus as defined in claim 3 wherein said first means for determining includes means for identifying access circuits in the node that are affected by the detected fault, means for identifying an associated virtual link for each access circuit in the node which is affected by the detected fault and means for generating an access circuit control signal representative that a corresponding access circuit is mapped to a virtual link that is affected by the detected fault, said second means for determining includes means for selecting and identifying an at least one alternate virtual link present in the node for each virtual link associated with the node that is affected by the fault and not terminated in the node and means for generating a frame relay control signal representative that an identified alternate virtual link is to be mapped to said identified affected virtual link, and wherein said means for switching includes means responsive to said access circuit control signal for changing the identity of said virtual link associated with the identified access circuit to an alternate virtual link identity, wherein said access circuit is mapped to an alternate virtual circuit and means responsive to said frame relay control signal for mapping said identified affected virtual link to said identified alternate virtual link.

7. The apparatus as defined in claim 3 wherein said virtual circuit may include a virtual link being mapped to another virtual link in a node, and wherein said means for generating a fault indication message includes means for identifying a virtual link to which a virtual link affected by the detected fault is mapped to and means for including the identity of the identified virtual link as an address for the fault indication message being generated for the affected virtual circuit, and wherein said first means for transmitting supplies said generated fault indication message as an output on an associated affected virtual circuit.

8. The apparatus as defined in claim 3 wherein said second means for transmitting includes means for determining an identity of a virtual link in said received fault indication message, means for determining an identity of an associated virtual link to which said identified virtual link is to be connected to, means for changing the virtual link identification in the fault indication message to that of the associated virtual link and means for supplying the fault indication message including the associated virtual link identity as an output on an associated affected virtual circuit.

9. The apparatus as defined in claim 3 wherein said fault indication message comprises a frame including a plurality of fields, a predetermined field including an identity of a virtual link of a virtual circuit affected by the detected fault and a field including an indication of whether a fault condition exists.

10. The apparatus as defined in claim 9 wherein a field in said frame includes an indication representative that the frame is a fault indication message.

11. The apparatus as defined in claim 10 wherein said frame is a LAPD XID frame having a field including an indication that the frame is an XID frame.

12. A packet network including a plurality of packet nodes, each of the packet nodes including apparatus for recovering from faults in transmission paths including at least one virtual circuit associated with the node, the apparatus comprising:
    means for detecting faults in at least one transmission path associated with the node;
    first means for determining if any virtual circuit affected by a detected fault is terminated in the node;
    second means for determining if any virtual circuit affected by the fault has at least one alternate virtual circuit present in the node;
    means for generating fault indication messages for virtual circuits afffected by the detected fault that are not terminated in the node and have no alternate virtual circuit present in the node;
    first means for transmitting each of said generated fault indication messages on associated virtual circuits to some other node in the network; and
    means for switching any affected virtual circuits determined to be terminated in the node or determined to have at least one alternate virtual link present in the node to associated alternate virtual circuits for transmission toward a destination node.

13. The apparatus as defined in claim 12 further including
    means for receiving fault indication messages including third means for determining if a virtual circuit identified in a received fault indication message is terminated in the node and fourth means for determining if a virtual circuit identified in a received fault indication message has at least one alternate virtual link present in the node, and
    second means for transmitting any of said received fault indication messages not associated with a virtual circuit terminated in the node or not having at least one alternate virtual circuit present in the node on associated virtual circuits to some other node in the network.

14. The apparatus as defined in claim 13 wherein each of said virtual circuits comprises a first access circuit at an originating node, a second access circuit at a destination node and at least one virtual link.

15. The apparatus as defined in claim 14 wherein said first means for transmitting includes means for transmitting said fault indication messages in a direction away from the detected fault and towards the detected fault on said associated virtual circuits.

16. The apparatus as defined in claim 14 wherein said received fault indication message includes an identity of an affected virtual link of a virtual circuit, said third means for determining includes means for generating a first control signal representative of whether said virtual link identified in the received fault indication message is mapped to an access circuit in the node, said fourth means for determining includes means for generating a second control signal representative that at least one alternate virtual link is present in the node for said virtual link identified in said received fault indication message, and said means for switching includes first switching means being responsive to said first control signal for changing the identity of said identified virtual link to an alternate virtual link identity when said first control signal indicates that said virtual link is mapped to an access circuit in the node, wherein said access circuit is mapped to an alternate virtual circuit for transmission to said access circuit in said destination node and second switching means being responsive to said second control signal for selecting and identifying said at least one alternate virtual link so that said identified affected virtual link is mapped to said selected at least one alternate virtual link for transmission to said access circuit at said destination node.

17. The apparatus as defined in claim 14 wherein said first means for determining includes means for identifying access circuits in the node that are affected by the detected fault, means for identifying an associated virtual link for each access circuit in the node which is affected by the detected fault and means for generating an access circuit control signal representative that a corresponding access circuit is mapped to a virtual link that is affected by the detected fault, said second means for determining includes means for selecting and identifying an at least one alternate virtual link present in the node for each virtual link associated with the node that is affected by the fault and not terminated in the node and means for generating a frame relay control signal representative that an identified alternate virtual link is to be mapped to said identified affected virtual link, and wherein said means for switching includes means responsive to said access circuit control signal for changing the identity of said virtual link associated with the identified access circuit to an alternate virtual link identity, wherein said access circuit is mapped to an alternate virtual circuit and means responsive to said frame relay control signal for mapping said identified affected virtual link to said identified alternate virtual link.

18. The apparatus as defined in claim 14 wherein said virtual circuit may include a virtual link being mapped to another virtual link in a node, and wherein said means for generating a fault indication message includes means for identifying a virtual link to which a virtual link affected by the detected fault is mapped to and means for including the identity of the identified virtual link as an address for the fault indication message being generated for the affected virtual circuit, and wherein said first means for transmitting supplies said generated fault indication message as an output on an associated affected virtual circuit.

19. The apparatus as defined in claim 14 wherein said second means for transmitting includes means for determining an identity of a virtual link in said received fault indication message, means for determining an identity of an associated virtual link to which said identified virtual link is to be connected to, means for changing the virtual link identification in the fault indication message to that of the associated virtual link and means for supplying the fault indication message including the associated virtual link identity as an output on an associated affected virtual circuit.

20. The apparatus as defined in claim 14 wherein said fault indication message comprises a frame including a plurality of fields, predetermined field including an identity of a virtual link of a virtual circuit affected by the detected fault and a field including an indication of whether a fault condition exists.

21. The apparatus as deffined in claim 20 wherein a field in said frame includes an indication representative that the frame is a fault indication message.

22. The apparatus as defined in claim 21 wherein said frame is a LAPD XID frame having a field including an indication that the frame is an XID frame.

23. A method for recovering from faults in transmission paths including at least one virtual circuit associated with a packet node in a network including a plurality of packet nodes, the method comprising the steps of:
detecting faults in at least one transmission path associated with the node;
determining if any virtual circuit affected by a detected fault is terminated in the node;
determining if any virtual circuit affected by the fault has at least one alternate virtual circuit present in the node;
generating fault indication messages for virtual circuits affected by the detected fault that are not terminated in the node and have no alternate virtual circuit present in the node;
transmitting each of said generated fault indication messages on associated virtual circuits to some other node in the network; and
switching any affected virtual circuits determined to be terminated in the node or determined to have at least one alternate virtual link present in the node to associated alternate virtual circuits for transmission toward a destination node.

24. The method as defined in claim 23 further including the steps of
receiving fault indication messages including the steps of determining if a virtual circuit identified in a received fault indication message is terminated in the node and determining if a virtual circuit identified in a received fault indication message has at least one alternate virtual link present in the node, and
transmitting any of said received fault indication messages not associated with a virtual circuit terminated in the node or not having at least one alternate virtual circuit present in the node on associated virtual circuits to some other node in the network.

25. The method as defined in claim 24 wherein each of said virtual circuits comprises a first access circuit at an originating node, a second access circuit at a destination node and at least one virtual link.

26. The method as defined in claim 25 wherein said step of transmitting includes a step of transmitting said fault indication messages in a direction away from the detected fault and towards the detected fault on said associated virtual circuits.

27. The method as defined in claim 25 wherein said fault indication message comprises a frame including a plurality of fields, a predetermined field including an identity of a virtual link of a virtual circuit affected by the detected fault and a field including an indication of whether a fault condition exists.

28. The method as defined in claim 25 wherein a field in said frame includes an indication representative that the frame is a fault indication message.

29. The method as defined in claim 28 wherein said frame is a LAPD XID frame having a field including an indication that the frame is an XID frame.

* * * * *